United States Patent Office 3,651,072
Patented Mar. 21, 1972

3,651,072
3-(HALOPHENOXY) PYRIDINES
Kurt A. Nowotny, Camas, Wash., assignor to Monsanto Company, St. Louis, Mo.
No Drawing. Continuation-in-part of application Ser. No. 443,063, Mar. 26, 1965. This application Aug. 21, 1967, Ser. No. 661,782
Int. Cl. C07d 31/30
U.S. Cl. 260—297          4 Claims

ABSTRACT OF THE DISCLOSURE

Halogenated phenoxypyridines which can be represented by the formula

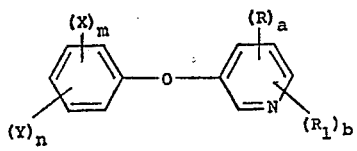

where X, Y, R and $R_1$ are each selected from the group consisting of fluoro, chloro and bromo; $m$ and $n$ are whole numbers from 0 to 5 and the sum of $m+n$ is from 0 to 5; $a$ and $b$ are whole numbers from 0 to 2 and the sum of $a+b$ is from 0 to 2; provided that the sum of $a+b+m+n$ is from 1 to 7; and mixtures thereof.

---

This application is a continuation-in-part of my co-pending application Ser. No. 443,063, filed Mar. 26, 1965, now abandoned.

This invention relates to certain novel pyridine derivatives which are halogenated 3-phenoxypyridines and which can be represented by the formula

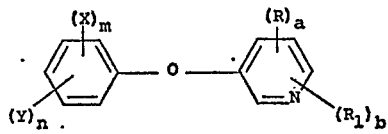

where X, Y, R and $R_1$ are each selected from the group consisting of fluoro, chloro and bromo; $m$ and $n$ are whole numbers from 0 to 5 and the sum of $m+n$ is from 0 to 5; $a$ and $b$ are whole numbers from 0 to 2 and the sum of $a+b$ is from 0 to 2; provided that the sum of $a+b+m+n$ is from 1 to 7; and mixtures thereof. The preferred compounds of this invention, which possess the combination of wide liquid range and fire resistance, as more fully discussed hereinafter, are those of the above structure where $n$ and $b$ are 0, X and R are each selected from bromo and chloro and the sum of $a+m$ is 1 to 3; provided that when $a+m$ is 1, X or R, as the case may be, is bromo.

The compounds of this invention are useful as functional fluids, which term includes many different types of applications, such as electronics coolants, atomic reactor coolants, diffusion pump fluids, synthetic lubricants, damping fluids, bases for greases, force transmission fluids (hydraulic fluids) and as filter mediums for air conditioning systems. Because of the wide variety of applications and the varied conditions under which functional fluids are utilized, the properties desired in a functional fluid necessarily vary with the particular application in which it is to be utilized with each individual application requiring a functional fluid having a specific class of properties.

Of the foregoing the use of functional fluids as hydraulic fluids, particularly aircraft fluids, has posed what is probably the most difficult area of application. Thus, up to a few years ago the requirements for an aircraft hydraulic fluid could be described as follows:

The hydraulic power systems of aircraft for operating various mechanisms of an airplane impose stringent requirements on the hydraulic fluid used. Not only must the hydraulic fluid for aircraft meet stringent functional and use requirements but in addition such fluid should be as highly non-flammable as possible and must be sufficiently non-flammable to satisfy aircraft requirements for fire resistance. The viscosity characteristics of the fluid must be such that it may be used over a wide temperature range; that is, adequately high viscosity at high temperature, low viscosity at low temperature and a low rate of change of viscosity with temperature. Such temperature range is generally from —40° F. to 250° F. Its pour point should be low. Its volatility should be low at elevated temperatures of use and the volatility should be balanced; that is, selective evaporation or volatilization of any important component should not take place at the high temperatures of use. It must possess sufficient lubricity and mechanical stability to enable it to be used in the self-lubricated pumps, valves, etc. employed in the hydraulic systems of aircraft which are exceedingly severe on the fluid used. It should be thermally and chemically stable in order to resist oxidation and decomposition so that it will remain uniform under conditions of use and be able to resist the loss of desired characteristics due to high and sudden changes of pressure and temperature, high shearing stresses, and contact with various metals which may be, for example, aluminum, bronze, copper and steel. It should also not deteriorate the gaskets or packings of the hydraulic system. It must not adversely affect the materials of which the system is constructed, and in the event of a leak, should not adversely affect the various parts of the airplane with which it may accidentally come in contact, such as electrical wire insulation and paint.

While it is evident that the aforementioned requirements are quite severe, the development of the commercial supersonic transport (SST) has imposed requirements on any hydraulic fluid to be used therein which make the satisfaction of such prior requirements appear to be no problem at all.

In the first place, the SST flight control system will be more difficult to design than that of any current commercial aircraft since it must have excellent flight control characteristics both at subsonic and supersonic speeds. It is estimated that the SST, a Mach 3 aircraft, will spend approximately half its time at the climb, hold and approach conditions. Further, if past and current trends are any indication, it can be assumed that the SST hydraulic functions will be somewhat more numerous than those of current commercial jets. Indications are that the commercial SST will have about 1000–2000 hydraulic horsepower. This extended horsepower demand, needed to drive accessories, landing gear, and the control system, of itself will impose severe reliability considerations on the hydraulic fluid. Coupled to the factor of component numbers versus reliability is the factor of higher temperatures to which the system will be subjected. Surface temperatures of a Mach 6 aircraft will range from 450° F. to 600° F. or higher at stagnation points. By taking advantage of natural heat sinks, such as the fuel in a manner utilized in the B-70, the hydraulic system should be capable of performing with a fluid operating at 400° F. to 500° F. On the other end of the temperature scale, temperatures as low as —40° F. are anticipated.

The Commercial Jet Hydraulics Panel of SAE A6, which was initiated during 1961 for the purpose of investigating and making recommendations for correction of current fire resistant jet hydraulic systems, found that ⅔ of all hydraulic system incidents during a 1½-year period prior to June 1962 were due to external system leakage, largely from components such as lines, fittings, hoses and seals. This leakage problem was considered by the panel and industry in general to be a very undesirable situation from the standpoint of loss or powered control. In the SST, any leakage problems would be magnified excessively over and above the loss of powered control when one considers the temperatures involved. In this case, there is no longer the situation in which leakage fluid will issue into relatively cold areas but rather into ambient temperatures as high as 600° F. It is apparent that a flammable fluid injected into hot compartments would create a blow torch effect, an untenable condition. A fire-resistant fluid is thus of greater importance than ever before.

The principal problem facing a fluid supplier for the SST hydraulic system is, therefore, that of developing an SST fluid having temperature compatability to approximately 400° F. to 500° F., preferably combined with fire resistance. In addition to the foregoing an SST hydraulic fluid must still have the properties mentioned above, including good viscosity characteristics (over a quite extended temperature range), a low freezing point, low volatility, sufficient lubricity, no toxicity and compatibility with various metals, packings and gaskets. These requirements are in fact far more severe than they might appear to be because there are few, if any, individual compounds known which remain unstable over the extreme temperature range of at least 550° F. (i.e., from −50° F. crystallizing point to 500° F. thermal stability) much less provide such a usable range, are fire resistant and also have the desired viscosities.

It is, therefore, an object of this invention to provide functional fluid compositions having a combination of properties, such as wide liquid range and fire resistance, which make such compositions well suited for the various applications mentioned above. It is a further object of this invention to provide functional fluid compositions which are useful for the various applications mentioned above and particularly certain fluids useful as fire-resistant aircraft hydraulic fluids. A further object is to provide functional fluids useful as hydraulic fluids. A further object is to provide functional fluids useful as hydraulic fluids in supersonic aircraft. Other objects will be apparent from the following description of the invention.

The instant compounds can be prepared by (1) reacting an alkali metal salt of a 3-hydroxypyridine with halogenated benzene or conversely by (2) reacting an alkali metal salt of a phenol with a halogenated pyridine in which there is a halogen in the 3-position. To facilitate preparation of the compounds, an inert solvent can be used.

Thus, in carrying out the process of this invention suitable halogenated benzenes which can be reacted with a 3-hydroxypyridine include monohalogenated benzenes, e.g., fluorobenzene, chlorobenzene, bromobenzene and iodobenzene; dihalogenated benzenes, e.g., 1,2-difluorobenzene, 1,3-dichlorobenzene, 1-bromo-3-chlorobenzene, 1-fluoro-3-bromobenzene, 1-fluoro-4-chlorobenzene, 1-chloro-3-iodobenzene, and 1,4-dibromobenzene: trihalogenated benzenes, e.g., 1,2,3-trifluorobenzene, 1,3,5-trichlorobenzene and 1,2,4-tribromobenzene; tetrahalogenated benzenes, e.g. 1,2,3,5-tetrafluorobenzene, 1,2,4,6-tetrachlorobenzene and 1,2,3,4-tetrabromobenzene; pentahalogenated benzenes, e.g., 1,2,3,4,5-pentafluorobenzene, 1,2,3,5,6-pentachlorobenzene and 1,2,4,5,6-pentabromobenzene; and the hexahalogenated benzenes.

Also useful in the claimed process, for reaction with a phenol are various halogenated pyridines, such as monohalogenated pyridine, e.g., 3-fluoropyridine, 3-chloropyridine and 3-bromopyridine; the dihalogenated pyridines, e.g., 3,4-difluoropyridine, 3,5-dichloropyridine and 2,3-dibromopyridine; and the trihalogenated pyridines, e.g., 2,3,4-trifluoropyridine, 3,4,5-trichloropyridine and 2,3,5-tribromopyridine.

In addition to the use of the potassium salts of the various hydroxy-containing benzenes and pyridines, the sodium salt can also be used; however, the potassium salt is preferred because of its greater solubility in the solvents which are suitable for use in the process. Useful solvents are those which in addition to being inert in the process are sufficiently thermally stable at temperatures up to about 250° C. and yet are liquid at room temperature. Examples of such solvents are, in addition to diglyme, similar alkoxyethyl ethers, pyrrolidone, N-alkylpyrrolidones such as N-methylpyrrolidone, and dialkylcarboxamides such as dimethylacetamide. In carrying out the process of this invention, the reaction mass is heated at temperatures of the order of about 100° C. to about 250° C. in order to complete the reaction.

As will be noted from a perusal of the illustrative examples given below, a catalyst is used, namely cuprous ion or a source of cuprous ion when the solvent is an alkoxyethyl ether. In addition to cuprous chloride other cuprous halides, cuprous oxide, cuprous salts of carboxylic acids, e.g., cuprous acetate, cuprous sulfate, copper metal and copper bronze can be used. Furthermore, the cupric counterparts of the aforementioned cuprous salts can also be used. Although potassium iodide is used in the illustrative examples its presence is not essential to the process; however, it is desirable to use potassium iodide or other source of iodine ion as a co-catalyst in order to minimize reaction times.

The following examples serve to illustrate the preparation of compounds of this invention. Parts are parts by weight.

EXAMPLE 1

Into a suitable reaction vessel having means for the addition of reactants and solvent, means for heating and cooling the vessel contents, means for measuring the temperature of materials within the vessel and means for agitating the vessel contents and fitted with a distillation column and condenser, there were charged 95.1 parts of 3-hydroxypyridine, 61.1 parts of 90% potassium hydroxide and 100 ml. of toluene. The resulting mixture was heated at reflux temperature and the water formed by the preparation of the potassium salt of 3-hydroxypyridine removed by azeotropic distillation. After distilling the toluene from the reaction mixture 300 ml. of diglyme, 408 parts of o-dibromobenzene, 3 parts of cuprous chloride and 2 parts of potassium iodide were added. The reaction mixture was heated to 160° C. and maintained at that temperature for about 8 hours. Thereafter the diglyme was distilled from the reaction mass at 110° C. and reduced pressure. The residue was diluted with ether, filtered and dried. The ether was then evaporated and the residue fractionated to give 3 - (2'-bromophenoxy)pyridine, a colorless liquid having a boiling point of 118° C. at 0.6 mm. of mercury, an index of refraction, $n_D^{25}$ of 1.6095 and a melting point of 28° C. (82° F.).

EXAMPLE 2

In the manner of Example 1, 95.1 parts of 3-hydroxypyridine and 61 parts of potassium hydroxide were first reacted to prepare the potassium salt of 3-hydroxypyridine. The potassium salt was then reacted with 472 parts of m-dibromobenzene in the presence of 3 parts of cuprous chloride and 2 parts of potassium iodide in diglyme at a pot temperature of about 165° C. for about twelve hours. Thereafter the reaction mass was worked up as in Example 1 and fractionated to give 3-(3'-bromophenoxy)pyridine, a colorless liquid having a boiling point of 121° C. at 0.5 mm. of mercury, an index of refraction, $n_D^{25}$ of 1.6119 and a decomposition temperature, $T_D$, of about 550° F.

EXAMPLE 3

Again following the general procedure of Example 1, 190.2 parts of 3-hydroxypyridine, 122.0 parts of potassium hydroxide, 944 parts of p-dibromobenzene, 6 parts of cuprous chloride and 4 parts of potassium iodide were utilized to prepare 3-(4'-bromophenoxy)pyridine, a colorless liquid having a boiling point of 123° C. at 0.3 mm. of mercury, an index of refraction, $n_D^{25}$ of 1.6525 and a melting point of 28° C. (82° F.).

EXAMPLE 4

Into a suitable reaction vessel there was charged 91.5 parts of 3-hydroxypyridine and 61.1 parts of 90% potassium hydroxide. After the potassium hydroxide was dissolved, 100 ml. of toluene was added and the water present was removed by azeotropic distillation. About 70 ml. of toluene was then stripped, after which 300 ml. of N-methylpyrrolidone was added. After adding 125 parts of m-difluorobenzene, the resulting mixture was heated at temperatures in the range of about 140°–170° C. for about 20 hours, after which the product was isolated in the usual manner. After drying the crude product it was fractionated to yield 3-(3'-fluorophenoxy)-pyridine, a colorless liquid boiling at about 86° C. at 0.2 mm. of mercury having an index of refraction, $n_D^{25}$ of 1.5610.

EXAMPLE 5

Into a suitable reaction vessel there was charged 252 parts of 2,4-dibromophenol, 61 parts of 90% potassium hydroxide and 300 ml. of N-methylpyrrolidone. After the hydroxide had been added, 100 ml. of toluene was added and the resulting mixture heated to remove all water present. The toluene was then stripped and an additional 500 ml. of N-methylpyrrolidone was added. There was then charged 296 parts of 3,5-dichloropyridine and the reaction mixture was heated at 155° C.–160° C. for about eight hours, after which the temperature was raised to about 200° C. for an additional eight hours. The N-methylpyrrolidone and any unreacted materials were then stripped after which the crude product was purified in the usual maner to provide 3-(2',4'-dibromophenoxy)-5-chloropyridine, which had a boiling range of 195° C.–162° C. at 0.6 mm. of mercury and an index of refraction, $n_D^{25}$ of 1.6444.

EXAMPLE 6

Into a suitable reaction vessel there was charged 257.12 parts of m-chlorophenol and 122 parts of potassium hydroxide. After the hydroxide had dissolved 100 ml. of toluene was added and the mixture heated in order to remove the water present by azeotropic distillation. The toluene was then stripped and replaced with 200 ml. of diglyme. The resulting mixture was then slowly added to a mixture of 512 parts of 3,5-dichloropyridine, 100 ml. of diglyme, 6 parts of cuprous chloride and 4 parts of potassium iodide. The composite mixture was then heated at about 160°–165° C. for about 20 hours after which the product was obtained in the usual manner. The final product, 3-(3'-chlorophenoxy)-5-chloropyridine, was a colorless liquid, having an index of refraction, $n_D^{25}$ of 1.6003 and a boiling range of 127° C.–134° C. at 0.35 mm. of mercury.

EXAMPLE 7

In the usual manner 190.2 parts of 3-hydroxypyridine, 122.2 parts of 90% potassium hydroxide and 569.6 parts of hexachlorobenzene were reacted in diglyme to provide 3-(2,3,4,5,6-pentachlorphenoxy)pyridine, a colorless solid having a melting point of 113° C.

In addition to the specific compounds prepared in the preceding examples other compounds of this invention include:

3-(2'-fluorophenoxy)pyridine;
3-(3'-fluorophenoxy)pyridine;
3-(4'-fluorophenoxy)pyridine;
3-(phenoxy)-2-fluoropyridine;
3-(phenoxy)-4-fluoropyridine;
3-(phenoxy)-5-fluoropyridine;
3-(phenoxy)-6-fluoropyridine;
3-(2'-fluorophenoxy)-4-fluoropyridine;
3-(3'-fluorophenoxy)-4-fluoropyridine;
3-(3'-fluorophenoxy)-4-chloropyridine;
3-(4'-bromophenoxy)-5-fluoropyridine;
3-(2',3',4',5',6'-pentafluorophenoxy)pyridine;
3-(2'-chlorophenoxy)pyridine;
3-(3'-chlorophenoxy)pyridine;
3-(4'-chlorophenoxy)pyridine;
3-(phenoxy)-2-chloropyridine;
3-(phenoxy)-4-chloro-pyridine;
3-(phenoxy)-5-chloropyridine;
3-(phenoxy)-6-chloropyridine;
3-(2'-chlorophenoxy)-4-chloropyridine;
3-(3'-chlorophenoxy)-4-chloropyridine;
3-(2',3'-dichlorophenoxy)pyridine;
3-(2',4'-dichlorophenoxy)pyridine;
3-(3',4'-dichlorophenoxy)pyridine;
3-(3',4'-dichlorophenoxy)-5-chloropyridine;
3-(3',4'-dichlorophenoxy)-5,6-dichloropyridine;
3-(3',5'-dichlorophenoxy)-5-bromopyridine;
3-(3',4'-5'-trichlorophenoxy)pyridine;
3-(2',3',4',5',6'-pentachlorophenoxy)pyridine;
3-(2'-bromophenoxy)-5-chloropyridine;
3-(3'-bromophenoxy)-3,5-dichloropyridine;
3-(4'-bromophenoxy)-2-bromopyridine;
3-(phenoxy)-5-bromopyridine;
3-(2',4'-dibromophenoxy)pyridine;
3-(2',3',4',5',6'-pentabromophenoxy)pyridine;
3-(2',3',4',5',6'-pentafluorophenoxy)pyridine.

In those cases where a polyhalogenated benzene or dihalogenated pyridine is used as halogen-containing reactant, the resulting product will be a mixture of the compounds claimed herein unless the halogens are symmetrically placed so that regardless of which halogen reacts the same product is formed. Thus, for example, 1,3,5-tribromobenzene or hexachlorobenzene or 3,5-dibromopyridine form only one compound. In any case, however, the mixtures of compounds resulting from the use of unsymmetrically halogenated reactants are also parts of the instant invention since such mixtures are also useful as functional fluids and in fact are highly desirable because they are difficult to crystallize. An example of such a mixture is the product obtained by reacting 1,2,4,6-tetrachlorobenzene with 3-hydroxypyridine which product would contain 3-(',4',5'-trichlorophenoxy)pyridine, 3-(2',4',6'-trichlorophenoxy)pyridine and 3-(2',3',5'-trichlorophenoxy)pyridine. If desired, however, the individual compounds can be separated by vapor phase chromatography or fractionation.

Other representative properties of the compounds of this invention are given in Table I below.

TABLE I

| | Melting point, °F. | Viscosity cs. | | |
|---|---|---|---|---|
| | | −30° F. | 100° F. | 210° F. |
| 3-(2'-bromophenoxy)pyridine | 82 | | 7.47 | 1.69 |
| 3-(3'-bromophenoxy)pyridine | (1) | 9,220 | 6.13 | 1.60 |
| 3-(4'-bromophenoxy)pyridine | 82 | | 6.26 | 1.64 |
| 3-(3'-fluorophenoxy)pyridine | (1) | 2 519.1 | 3.29 | 1.15 |
| 3-(2',4'-dibromophenoxy)-5-chloropyridine | (1) | 3 9,130 | 68.30 | 3.68 |
| 3-(3'-chlorophenoxy)-5-chloropyridine | (1) | 4 4,252 | 7.24 | 1.71 |

1 Did not crystallize at −50° F.
2 At −40° F.
3 At 45° F.
4 At −15° F.

It is noteworthy that while the compounds of this invention are liquids at or near ordinary room temperatures, compounds in which the phenoxy groups are in the 2- or 4-position of the pyridine ring are solids at significantly high temperatures. By way of illustration, 2-(3'-bromophenoxy)pyridine is a solid at ordinary or room temperatures and has a melting point of 140° F. (60° C.) whereas, as shown above, 3-(3'-bromophenoxy) pyridine does not crystallize at temperatures as low as −50° F., a quite unpredictable phenomena.

In addition to the above, the compositions of this invention are shear stable and are not prone to foaming and any foam formed is not stable. Furthermore, the claimed compounds and compositions have good stability, having thermal decomposition temperatures generally above about 550° F., and, in the presence of oxygen, are essentially non-corrosive to metals, such as aluminum, aluminum bronze, iron, silver and titanium. A further advantage of the instant compositions is their outstanding hydrolytic stability. The claimed compounds are also useful as antiwear agents in various base stocks such as mineral oils, polyphenyl ethers, polyphenyl thioethers, mixed polyphenyl ethers-thioethers, alkylthiophenes, ester lubricants and halogen-substituted diphenyl ethers.

As a result of the excellent physical properties of the functional fluids described herein, improved hydraulic pressure devices can be prepared in accordance with this invention which comprise in combination a fluid chamber and an actuating fluid in said chamber, said fluid comprising a mixture of one or more of the base stocks hereinbefore described. In such a hydraulic apparatus wherein a movable member is actuated by the above-described functional fluids, performance characteristics are obtainable which are superior to those heretofore obtainable.

Because of the excellent fire-resistance of the functional fluids of this invention, their exceptionally low pour points, and good lubricity, the functional fluids of this invention can be utilized in those hydraulic systems wherein power must be transmitted and the frictional parts of the system lubricated by the hydraulic fluid utilized. Thus, the novel functional fluids of this invention and mixtures thereof find utility in the transmission of power in a hydraulic system having a pump therein supplying the power for the system. In such a system, the parts which are so lubricated include the frictional surfaces of the source of power, namely the pump, valves, operating pistons and cylinders, fluid motors, and in some cases, for machine tools, the ways, tables and slides. The hydraulic system may be of either the constant-volume or the variable-volume type of system.

The pumps may be of various types, including the piston-type pump, more particularly the variable-stroke piston pump, the variable-discharge or variable displacement piston pump, radial-piston pump, axial-piston pump, in which a pivoted cylinder block is adjusted at various angles with the piston assembly, for example, the Vickers Axial-Piston Pump, or in which the mechanism which drives the pistons is set at an angle adjustable with the cylinder block; gear-type pump, which may be spur, helical or herringbone gear, variations of internal gears, or a screw pump; or vane pumps. The valves may be stop valves, reversing valves, pilot valves, throttling valves, sequence valves or relief valves. Fluid motors are usually constant- or variable-discharge piston pumps caused to rotate by the pressure of the hydraulic fluid of the system with the power supplied by the pump power source. Such a hydraulic motor may be used in connection with a variable-discharge pump to form a variable-speed transmission.

The compositions of this invention can also contain dyes, pour point depressants, antioxidants, antifoamants, defoamants, such as the silicone polymers, viscosity index improvers, such as polyalkylacrylates and polyalkylmethacrylates, lubricity agents and the like.

The halogenated phenoxypyridines of this invention have been discovered to possess phytotoxic or herbicidal activity and can be employed in methods of controlling the growth of plants.

The term "phytotoxicant" as used herein means materials which (1) effectively control all plants in a given locus or (2) selectively control the growth of one or more plant species in the presence of other plants. In like manner, "phytotoxic" and "phytotoxicity" are used to identify the overall and selective control activity of the compositions of this invention.

The term "plant" as used herein is inclusive of dormant seeds, germinant seeds, germinative seeds, emerging seedlings and established woody and herbaceous vegetation including the roots and above-ground portions.

The term "control" as used herein is inclusive of the actions of (1) killing, (2) inhibiting growth, reproduction or proliferation, and (3) removing, destroying or otherwise diminishing the occurrence and activity of plants and is applicable to any of the stated actions, or any combination thereof.

For the sake of brevity and simplicity, the term "active ingredient" is used hereinafter in this specification to describe the phytotoxic halogenated phenoxypyridines useful in the compositions and methods of this invention.

The phytotoxic activity of the active ingredients of this invention is demonstrated as follows: A good grade of top soil is placed in aluminum pans and compacted to a depth of ½" from the top of each pan. A pre-determined number of seeds of each of the various plant species are placed on top of the soil in each pan. The soil required to fill a pan is weighed and admixed with a phytotoxic composition containing a sufficient amount of active ingredient to obtain the desired rate of active ingredient per acre. The pans are then filled with the various admixtures and leveled.

The seed containing pans are placed on a wet sand bench and maintained under ordinary conditions of sunlight and watering. The plants are observed at the end of approximately 14 days and the results recorded. The phytotoxic activity index is based on the average percent control of each seed lot. The phytotoxic activity index is converted to a relative numerical scale for the sake of brevity and simplicity in the tables.

The phytotoxic activity index used is defined as follows:

| Average percent control: | Numerical scale |
|---|---|
| 0–25 | 0 |
| 26–50 | 1 |
| 51–75 | 2 |
| 76–100 | 3 |

In Table I, the various plant species are represented by letters as follows:

C—Morning glory
D—Wild oats
E—Brome grass
F—Rye grass
G—Radish
H—Sugar beets
I—Cotton
J—Corn
K—Foxtail
L—Barnyard grass
M—Crab grass
N—Pigweed
O—Soybean
P—Wild buckwheat
Q—Tomato
R—Sorghum
S—Rice
T—Smartweed
U—Cockelbur
V—Lambsquarter
W—Horsenettle

TABLE II.—PRE-EMERGENT PHYTOTOXIC ACTIVITY

| Compound | Rate, lb./acre | C | D | E | F | G | H | I | J | K | L | M | N | O | P | Q | R | S | T | U | V | W |
|---|---|---|---|---|---|---|---|---|---|---|---|---|---|---|---|---|---|---|---|---|---|---|
| 3-(4'-bromophenoxy)-pyridine | 5 | 0 | 0 | 1 | 1 | 0 | 0 | 0 | 1 | 3 | 1 | 3 | 1 | 0 | 2 | 0 | 0 | 0 | | | | |
| 3-(3'-bromophenoxy)-pyridine | 5 | 0 | 2 | 2 | 3 | 1 | 3 | 0 | 1 | 3 | 1 | 3 | 3 | 0 | 2 | 0 | 3 | 1 | | | | |
| 3-(3'-chlorophenoxy)-5-chloropyridine | 5 | 3 | 3 | 3 | 3 | 3 | 3 | 1 | 3 | 3 | 3 | 3 | 3 | 1 | 2 | 2 | 3 | 3 | 1 | 0 | 3 | 3 |
| 3-(2',4'-dibromophenoxy)-5-chloropyridine | 1 | | 1 | 0 | | | 0 | 0 | 1 | | 1 | | 2 | 1 | | | | | 1 | | 3 | 2 | |

While carrying out the above and other pre-emergent tests with the active ingredients of this invention, numerous specific plant growth responses were observed and recorded. Some of the observed plant growth responses are given in Table III.

TABLE III

| Compound | Rate, lb./acre | Response |
|---|---|---|
| 3-(2,4-dibromophenoxy)-5-chloropyridine. | 10 | Stunting of broadleaf species. Tillering of grasses. |

The post-emergent plant growth regulant activity of representative active ingredients of this invention is demonstrated as follows. The active ingredients are applied in spray form to 21-day old specimens of many of the same plant species used in the preceding pre-emergent tests. The spray is an acetone-water solution containing 0.5% active ingredient. The solution is applied to the plants in different sets of pans at a rate equal to approximately 10 pounds of active ingredient per acre. The treated plants are placed in a greenhouse and the effects are observed and recorded after approximately 14 days.

The post-emergent phytotoxic activity index used in Table III is measured by the average percent control of each plant species and is defined as follows:

| Average percent control: | Numerical scale |
|---|---|
| 0–25 | 0 |
| 26–50 | 1 |
| 51–75 | 2 |
| 76–99 | 3 |
| 100 | 4 |

The identification of the plants used is the same as in the preceding pre-emergent tests. Results and further details are given in Table IV.

The active ingredients of this invention are particularly useful for the control of weed plants in the presence of cotton and soybeans.

While this invention has been described with respect to various specific examples and embodiments, it is to be understood that the invention is not limited thereto and that it can be variously practiced with the scope of the following claims.

The embodiments of this invention in which an exclusive property or privilege is claimed are defined as follows:

1. A compound represented by the structure

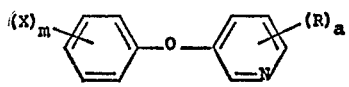

where X and R are chloro, m is a whole number from 1 to 5 and a is a whole number from 1 to 2.

2. A compound represented by the structure

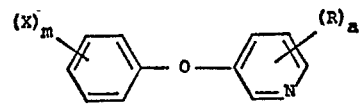

where X and R are bromo, m is a whole number from 1 to 5 and a is a whole number from 1 to 2.

3. A compound of claim 2 represented by the structure

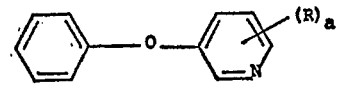

where R is chloro and a is a whole number from 1 to 2.

4. A compound of claim 2 represented by the structure

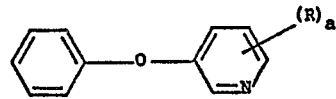

where R is bromo and a is a whole number from 1 to 2.

TABLE IV.—POST-EMERGENT PHYTOTOXIC ACTIVITY

| Compound | Rate, lb./acre | Plant | | | | | | | | | | | | | | |
|---|---|---|---|---|---|---|---|---|---|---|---|---|---|---|---|---|
| | | C | D | E | F | G | H | I | J | K | L | M | N | O | P | Q | R |
| 3-(2'-bromophenoxy)-pyridine | 10 | 1 | 0 | 0 | 0 | 2 | 2 | | | 1 | | 1 | 4 | 2 | 3 | 3 | 0 |
| 3-(2',4'-dibromophenoxy)-5-chloropyridine | 10 | 1 | 3 | 3 | 1 | 3 | 3 | | | 4 | | 3 | 4 | 0 | 2 | 4 | 3 |

References Cited

UNITED STATES PATENTS 2,583,425   1/1952   Hawley _____ 167—30
3,429,689   2/1969   Duerr et al. _____ 260—297

OTHER REFERENCES

The Merck Index, Seventh Edition, p. 1478, 1960. RS 356 M 524.

Jerchel et al., Berichte, 89, pp. 2921–2925 (1956). QD1 D4.

Bradsher et al., J. Org. Chem., vol. 26 (1961), pp. 3273–3276. QD 241 J6.

ALAN L. ROTMAN, Primary Examiner

U.S. Cl. X.R.

71—94; 252—78